Figure 9:
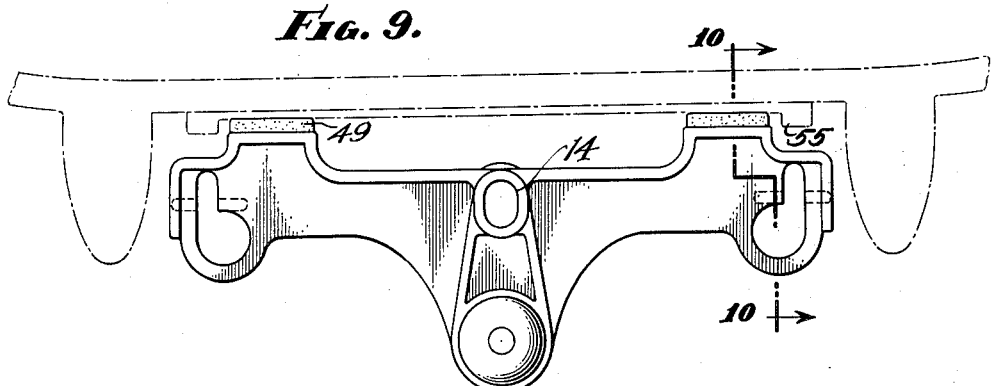

May 7, 1957  V. H. WANAMAKER  2,791,445
BUMPER ATTACHED TRAILER HITCH
Filed Nov. 15, 1954  3 Sheets-Sheet 1
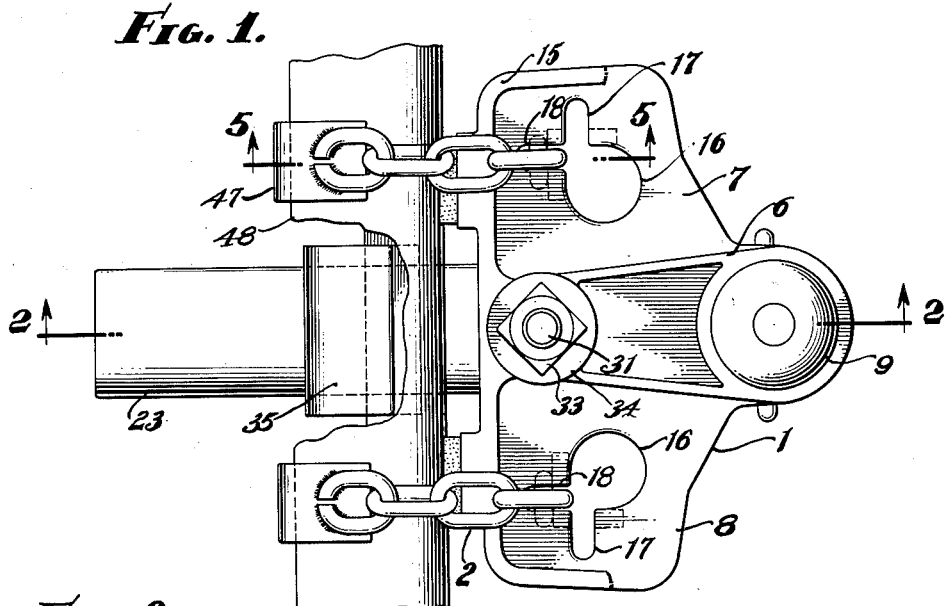
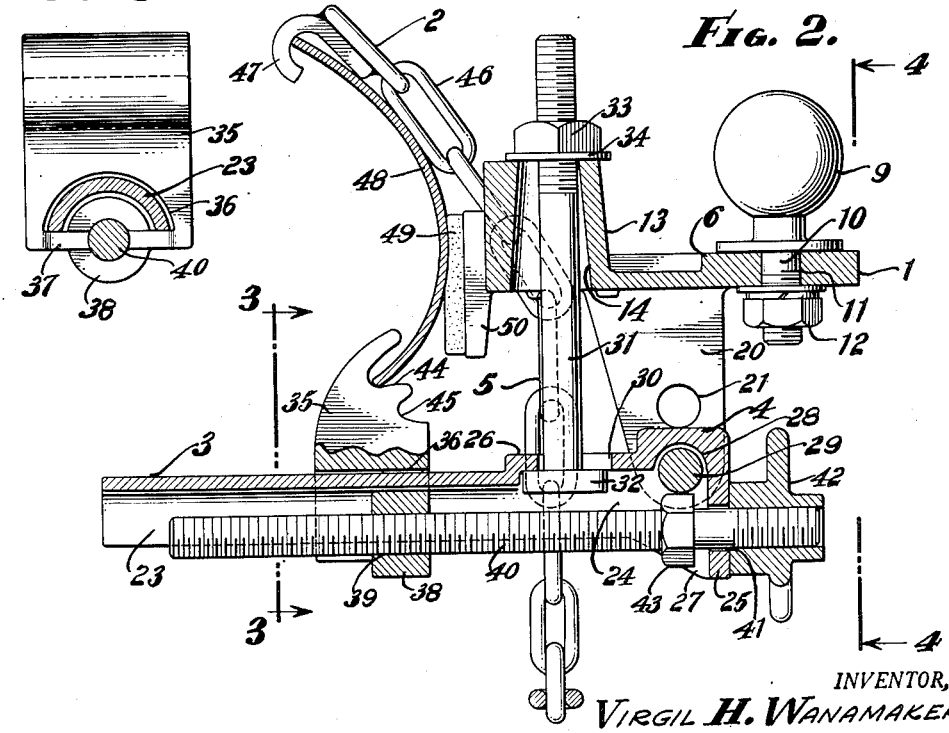
INVENTOR,
VIRGIL H. WANAMAKER;
BY
ATTORNEY.

May 7, 1957     V. H. WANAMAKER     2,791,445
BUMPER ATTACHED TRAILER HITCH
Filed Nov. 15, 1954     3 Sheets-Sheet 2

INVENTOR,
VIRGIL H. WANAMAKER;
BY
Calvin Brown,
ATTORNEY.

INVENTOR,
VIRGIL H. WANAMAKER;
BY
ATTORNEY.

United States Patent Office 2,791,445
Patented May 7, 1957

2,791,445

BUMPER ATTACHED TRAILER HITCH

Virgil H. Wanamaker, North Hollywood, Calif.

Application November 15, 1954, Serial No. 468,707

3 Claims. (Cl. 280—502)

The present invention relates to a trailer hitch of the type adapted to be secured to the rear bumper of a draft vehicle for coupling connection with a trailer.

An object of the invention is to provide a trailer hitch of universal adaptability to fit draft vehicle bumpers of any cross section. Bumpers today vary in cross section, and are often provided with gravel pans between the rear bumper and the vehicle body. Certain of the modern bumpers on automobiles incorporate license plate holders, and the present invention is so constructed and arranged as to effectively and efficiently engage the rear bumper without interference with the license plate frame or the gravel pan.

A further object is the provision of a trailer hitch which may be clamped rigidly to a bumper at various angular positions, to the end that a coupling member between the draft vehicle and the trailer may be maintained in position for most efficient use.

A further object is to provide an improved trailer hitch which is inexpensive in cost of manufacture, simple of construction, of great strength, which may be attached or detached from a bumper in a minimum of time, and which will not mar or damage the bumper or any adjacent structure.

With the above mentioned and other objects in view, the invention consists in the novel and useful provision, formation, construction, association, and relative arrangement of parts, members and features, all as shown in certain embodiments in the accompanying drawings, described generally, and more particularly pointed out in the claims.

Figure 10:
Figure 11:
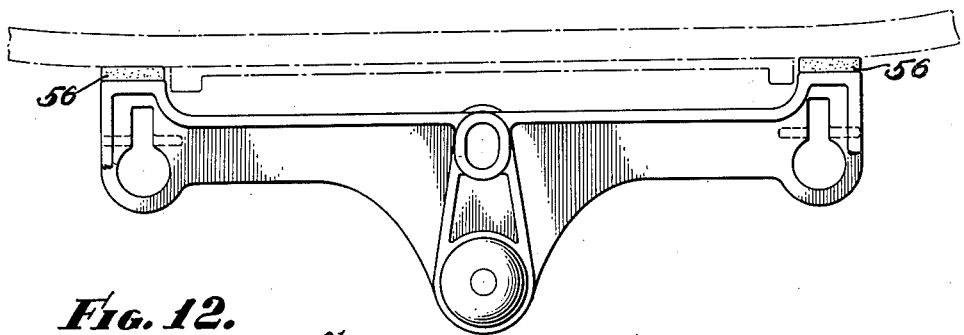
Figure 12:
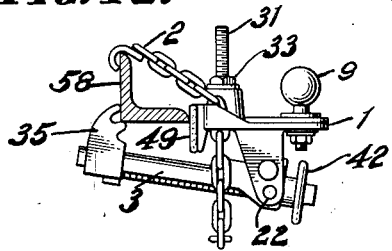
Figure 13:
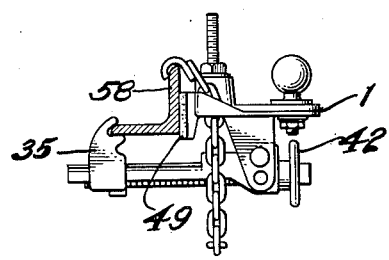
Figure 14:
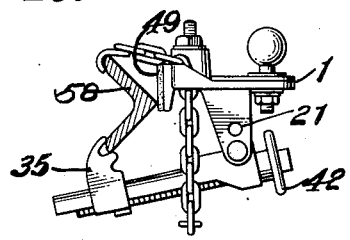

In the drawings:

Figure 1 is a fragmentary top plan view of one form of trailer hitch embodying the invention, Figure 2 is a sectional view of the device shown in Figure 1 and taken on the line 2—2 of said figure, Figure 3 is a sectional view on the line 3—3 of Figure 2, showing elements of the lower clamp assembly, Figure 4 is a fragmentary end elevation, looking in the direction of the arrows 4—4 of Figure 2, Figure 5 is a sectional view on the line 5—5 of Figure 4, Figure 6 is a fragmentary view of a modified structure incorporating the invention, Figure 7 is a fragmentary enlarged view, partly in section, of certain of the structure shown in Figure 6, Figure 8 is a fragmentary sectional view, on an enlarged scale, taken on the line 8—8 of Figure 6, Figure 9 is a plan view of a portion of the invention adapted for placement within a license plate framing carried by a bumper, Figure 10 is a sectional view on the line 10—10 of Figure 9, Figure 11 is a view similar to Figure 9, the trailer hitch being enlarged so as to straddle a license plate framing, and, Figures 12, 13 and 14 are side elevations, the rear bumper being shown in cross section in various positions, and showing adjustment features for the trailer hitch shown in Figures 1 and 2 to fit the rear bumper in said positions.

Referring now with particularity to the drawings, and specifically to Figures 1 to 3, inclusive, the invention in one of its adaptations includes a hitch plate 1, an upper clamp or hook assembly 2, which cooperates with the draft vehicle bumper and with the hitch plate, a lower jaw or clamp assembly 3, and assemblies 4 and 5 interconnecting the hitch plate and the lower jaw or clamp assembly 3.

The hitch plate 1 has a central transverse portion 6 which extends forwardly of side or wing portions 7 and 8, and said portion 6 is adapted to carry a coupling ball 9. Coupling balls are conventional in the art and are usually provided with a threaded bolt 10 passed through, in the present instance, a bore 11, which bolt is adapted to receive a washer-nut combination 12, as best shown in Figure 2. Through the medium of a coupling arm, operating in conjunction with the coupling ball, the hitch is secured to the draft vehicle. The hitch plate is provided on its top surface with a central boss 13, which boss is formed with a through bore of elliptical section and tapered from the base of the boss to the top thereof, as shown at 14 (Figures 2 and 9). For strengthening purposes, the sides or wings 7 and 8 are provided with edge flanges 15 which merge with the boss 13. Each side or wing is provided with a bore 16 and a pair of angularly related slots 17 and 18, which enter the bore 16. Depending from the bottom surface of the hitch plate, at the central portion 6, are a pair of parallel, spaced apart ears, lugs, or supports 19 and 20 (see Figure 4). The ears or lugs are provided with vertically spaced, axially aligned, transverse bores, as shown at 21 and 22 (see Figures 2 and 12).

The lower jaw or clamp assembly 3 includes an elongated bar, a length of which, 23, is of semi-annular cross section, which merges with a channel section 24 having an end wall 25, a substantially flat top 26 and a pair of parallel side walls 27. The top wall of the channel section of the bar is stepped, as shown in Figure 2, with the inner surface of the stepped portion of transverse concave form, as shown at 28. A pin 29 provided with a head is adapted to be passed through certain of the aligned bores 21 and 22, and be positioned in the concavity 28, as illustrated in Figure 2. In Figure 4, I have shown the pin 29 secured in the respective bores of the supports by using a cotter pin 29ᵃ. In this manner, the lower jaw or clamp assembly 3 is hinged for rocking movement to the hitch plate 1. The flat top 26 of the bar 23 is provided with an elongated transverse slot 30 in approximate alignment with the tapered bore 14. In addition to the hinged connection between the hitch plate and the lower jaw or clamp assembly, I provide a floating bolt connection between said members, in that a bolt 31 having a head 32 is positioned beneath the portion 26, the bolt shank being passed through slot 30, the tapered slot 14 of the boss 13, and held by means of a nut 33 carried by the threads of the bolt and engaging a washer 34 which bridges the tapered bore of the boss and rests on the top surface of said boss.

Included in the clamp assembly 3 is a clamp 35. This clamp is formed from a block provided with a curved slot 36 conforming to the semi-annular section of bar 23, as see Figure 3. There is also provided for said clamp a bridging portion 37, which includes an enlargement 38 formed with a central screw-threaded bore at 39. A clamp adjusting screw 40 has a portion passed through a bore 41 in the end wall 25, this portion of the adjusting screw being smooth or without threads, and a portion outwardly of said wall 25, which is threaded, to receive a hand wheel 42. The adjusting screw 40 is in threaded connection with the threaded bore 39 of the clamp, whereby upon turning the wheel 42, the clamp is caused to move in two directions upon its supporting bar. A limit nut 43 is carried upon the adjusting screw 40 inward of the wall 25. The clamp 35 is provided along one edge with one or more transverse bumper receiving grooves 44 and 45 which are at different vertical heights above the bar.

The upper clamp or hook assembly includes a chain 46 and a hook member 47 secured to the last link at one end of said chain. This upper clamp or hook assembly 2 may include more than one hook and chain, as shown in Figure 1, there being a chain and hook for each wing or side of the hitch plate. While the chains may be separate, still I may provide the construction as shown in Figure 4, wherein both ends of a single chain carry a hook 47. This assures against loss of separate chains.

A hitch of the character just described is mounted, as a rule, in contact with a bumper, such as, for instance, shown in Figures 1 and 2 at 48, and to prevent any damage to the surface of the bumper through use of the hitch, I have provided a pair of pads which may be formed of rubber 49. These pads are carried by suitable backing plates 50 formed on the hitch plate, adjacent the flanged portion 15.

In general, the draft device as illustrated in Figures 1 to 4, inclusive, is utilized for all adaptations of the invention. Thus, in Figure 6, I use two of the devices shown in Figure 1, spaced apart and secured together by means of a draft bar 51. The draft bar 51 centrally is provided with a coupling ball 52 and in place of using the coupling ball 9, the draft bar is provided with a series of spaced bores inward from each end thereof, as shown at 53, through which bores bolts 54 are passed for securing the draft bar to the two spaced apart hitch plates.

In Figure 9, I have shown a hitch plate which includes the same elements as the hitch plate shown in Figure 1, but which hitch plate is of greater length, with the pads 49 positioned within the framing 55 of the license plate holder carried by the bumper. In place of using two slots, as shown at 17 and 18, for the wings 7 and 8, a single slot may be used, as shown.

In Figure 11, I have shown a further adaptation of the invention in which the hitch plate is of a length greater than the license plate frame so that the pads 56 straddle the frame. In this instance, a single slot communicates with the circular slots in the wings of the hitch plate. The hitch plates of both Figures 9 and 11 function in the same manner as the hitch plate 1.

The operation, uses and advantages of the invention just described are as follows:

The present hitch will adapt itself to any bumper section. Thus, in Figure 2, a concavo-convex type of bumper is shown, wherein the top edge of the bumper extends inwardly beyond the lower edge thereof. To attach the hitch to this type of bumper, the hitch plate is raised so as to have the pads 49 thereof engage the outer surface of the bumper, as shown, and the hooks or clamps 47 engage the top edge of the bumper. The chains 46 are passed through the bores 16 and then brought into the slots 18 so that certain of the links will transversely span the slots 17 or 18 and support the hitch in a horizontal plane. The hand wheel 42 is rotated so as to bring the clamp 35 into engagement with the lower edge of the bumper and, in this instance, the lower edge of the bumper is received within the transverse groove 44. The floating bolt 31 has the nut 33 so adjusted as to hold the bar of the lower jaw clamp assembly 3 substantially parallel with the hitch plate 1, with the result that the hitch, considered as an entirety, tightly engages the bumper. A coupling arm, secured to the draft vehicle, is secured to the coupling ball 9, and the hitch is ready for use.

Different bumper sections are shown in Figures 12 to 14, inclusive, and wherein I have shown an angle type bumper 58. Such a type of bumper is shown for the purpose of illustration only, as it illustrates the adaptability of the present invention.

In Figure 12, the face of the bumper 58 is toward the draft vehicle, and the clamp 35 engages two legs of said bumper. After adjusting the chain lengths through the openings 16 of the hitch plate, the pads 49 engage an edge of the bumper, as shown; however, the lower jaw and clamp assembly, and specifically the bar upon which the clamp 35 is carried, is at an angle to the plane of the hitch plate 1. The hand wheel 42 is rotated so as to cause the clamp to engage the bumper and the nut 33 is adjusted upon the bolt 31 to bring the hitch plate to a substantially horizontal position.

In Figure 13, the bumper is in a reverse position to that shown in Figure 12, and wherein the clamp 35 engages one leg of the bumper and, in this instance, the lower clamp or jaw assembly as well as the upper clamp and jaw assembly, and specifically the hitch plate, are substantially parallel.

In Figure 14, an extreme condition is illustrated, wherein the apex between the two legs of the bumper is engaged by the pads 49 and the lower jaw assembly, and specifically the bar upon which said lower clamp 35 is carried, is at an angle to the hitch plate 1.

Other conditions might be illustrated, such as presented by Figure 6. In this instance, two of the complete devices of Figure 1 are utilized with the draft bar 51 and the chains of the upper clamp or hook assembly are wrapped around guards 59 and 60 connected with the rear bumper 61, with ends of said chains received within the slots 17 and 18 of each hitch plate. The chains support the hitch plates while the lower jaw or hook assemblies tighten the hitch plates to the rear bumpers.

The construction shown in Figures 9 and 11 and the use thereof are thought to be obvious, as the chains of the upper clamp or hook assembly are received within the slotted portions connecting the circular bores in the hitch plate so as to initially support the said hitch plates in juxtaposition to the bumpers, whereupon the lower jaw or clamp assemblies are adjusted to cause tight engagement therewith with the bumper.

The device is universal as to its adaptability to any type of bumper, as has been set forth.

I claim:

1. The combination with the rear bumper of a draft vehicle, of a hitch for detachable engagement with said bumper; said hitch having a hitch plate and means for securing the hitch plate to a trailer; a pair of spaced chains for adjustable and detachable engagement with the hitch plate, each chain provided with a hook for engagement with the top edge of the bumper for supporting the hitch; a pair of spaced lugs depending from the hitch plate, an elongated bar beneath the hitch plate and rockably mounted between the pair of lugs, a clamp movable longitudinally of said bar, means carried by the bar and engaging the said clamp for effecting movement of the clamp in two directions, said clamp adapted to be moved to engage the bottom edge of the bumper, and means between the hitch plate and the said bar for adjustably rocking the said bar.

2. The combination with a bumper having top and bottom edges, of a hitch for engagement with said bumper; said hitch including a hitch plate provided with pads for engagement with a surface of the bumper, a pair of chains provided with hooks, the hooks engaging the top edge of the bumper and the chains adjustably supporting the hitch plate, an elongated bar positioned below the hitch plate, means for rockably mounting said elongated bar on the hitch plate, a clamp carried on the elongated bar, means between the elongated bar and the said clamp for moving the clamp in two directions, the said clamp adapted for engagement with the bottom edge of the said bumper, and means between the bar and hitch plate for adjustably swinging the bar relative to the hitch plate to maintain the hitch plate in a horizontal position.

3. In a device of the character disclosed, a plate having a central portion and a coupling ball carried by the plate at the central portion for securing the said plate to a draft vehicle, said plate provided with a boss extending from one surface thereof, the said boss provided with an oval shaped, tapered bore extending from the top of the said boss to the base thereof, said plate provided with a pair of depending lugs, an elongated bar pivotally mounted between the said lugs, said elongated bar having a portion thereof of semi-annular form, a clamp slidably mounted upon said semi-annular bar, a screw bolt carried by said bar for engagement with said clamp for adjusting movement of the clamp on said bar, an elongated bolt extending between the said bar and passed through the bore of said boss, and means carried by said last named bolt and engaging the boss for adjusting the rocking movement of the said bar relative to the said hitch plate.

References Cited in the file of this patent

UNITED STATES PATENTS

| | | |
|---|---|---|
| 2,268,181 | Bolton | Dec. 30, 1941 |
| 2,306,007 | Thorp | Dec. 22, 1942 |
| 2,525,505 | Wiedman | Oct. 10, 1950 |
| 2,575,596 | Rettinger | Nov. 20, 1951 |
| 2,678,221 | Kohlsaat et al. | May 11, 1954 |